Patented Aug. 4, 1942

2,291,905

UNITED STATES PATENT OFFICE 2,291,905

PIPE COATING COMPOSITION

Edgar A. Koenig, Dallas, Tex., assignor to Socony-Vacuum Oil Company, Incorporated, New York, N. Y., a corporation of New York No Drawing. Application June 27, 1941, Serial No. 400,095

6 Claims. (Cl. 106—270)

This invention is directed specifically to a composition for application to the external surface of pipelines buried underground to protect said pipes against soil corrosion. Such compositions must be waterproofing in nature, chemically inert to soil acids and soil alkalies, capable of proofing against oxide forms of corrosion and salt water attack, and must be dielectric. Most important, they must be possessed of proper physical properties over a wide range of temperatures, to permit of equally good resistance to soil stresses, i. e., to relative movement between the soil and the pipe, arising from various causes, at both the low temperatures of winter exposure with cold oils in the pipe and the much higher temperature experienced in summer and when hot oil, i. e., oil heated to reduce its viscosity for easy pumping, is handled.

The object of this invention is to provide a pipe covering or waterproofing compound having this relatively constant physical capability over a fairly broad temperature range.

The usual compositions provided for such uses have an asphalt base and are compounded with various filling and modifying materials, ranging from inert fillers such as mica, clays, and similar materials to other materials such as paraffin waxes. A principal objection to many of these compositions is their relative "shortness" or lack of ductile properties over a suitably wide range. With most, a composition suitable for relatively low soil temperatures is entirely too soft for use at summer temperatures or with warmed oil, where it fails by being insufficiently hard to resist soil stresses, is mechanically broken, and permits entry of corrosive action, even though it may be an excellent protective agent when present in an unbroken film. Similarly, with compounds of known type, those hard enough to resist soil stress at higher temperatures, as in pipes transporting warmed oil, are too brittle to resist soil stresses, etc., at the low temperature end of the cycle and are broken, to permit entry of corrosive agents.

Since it is impossible to maintain any pipe at a relatively level temperature range, the mere mechanical failures due to the indicated lack of properly wide ranges of physical properties is an inherent defect of practically all prior art asphalt base compounds, and particularly of those compounded from asphalts of the usual type.

This invention is based upon the discovery that when a material of the class known as solvent tars is blown to form a relatively high melting point asphalt and that asphalt is blended with wax of a proper type, that the resulting compound has a desirably wide range over which physical properties are relatively not greatly changed to make it a much better compound than those heretofore known.

Solvent refining is a process wherein a distillate or long residue of a paraffinic or mixed base or even asphaltic crude oil is treated with a liquid solvent exerting a preferential solvent for so-called "non-paraffinic" constituents to separate the original oil into a desirable lubricating oil stock of "paraffinic" nature and a solvent tar. Many reagents may be so used, such as for example "chlorex" (dichlorodiethyl ether), nitrobenzene, furfural, phenol, cresol, liquid sulphur dioxide, and others. These may be used alone or in company with some substance, such as liquified propane, which exerts a preferential solvent action upon the desirable "paraffinic" lubricating oil material. The material separated and rejected by these processes is commonly known as a solvent extract or solvent tar. It must be distinguished here from the relatively pure bitumen precipitated by propane treatment of certain petroleum fractions, usually of residual nature, in the absence of selective solvents of the class first named.

My protective coating material is made by blowing or oxidizing such solvent tars to produce an asphalt having a melting point of about 175° F. to 240° F. and then blending that, in equal or nearly equal proportions with a wax having a melting point of about 125° F. to 150° F. to produce a material having a ring and ball melting point of about 127° F. to about 150° F. This product has been found to be sufficiently hard at the higher temperature ranges of use to not flow or scar or be removed by soil stresses and similar agencies, and still retains sufficient flexibility to withstand similar agencies at low temperature ranges where similar products are too brittle.

The proportions to be used are within the following range.

| | Per cent |
|---|---|
| Asphalt | 50 to 65 |
| Wax | 50 to 35 |

The presence of the wax prevents brittleness at low temperatures, and there should be a sufficient amount present to achieve this. Too much wax serves to weaken the bond between the compound and the pipe to which it is applied. The proportions above set forth appear to express the limits within which the compound is possessed of suitable properties.

The solvent tar blown asphalt should be one air blown to a melting point, (ring and ball) of about 175° F. to 240° F., a typical product having the following properties.

Air blown solvent tar asphalt

| | |
|---|---|
| Needle penetration at 77° F. | 6 |
| Ball and ring melting point °F. | 232 |
| Flash (C. O. C.) °F. | 600 |
| Solubility in CCl₄ per cent | 99.8 |
| Oliensis test: | |
| 1 hour | Pass |
| 24 hours | Pass |

With this there may be combined, for example, a clay wash wax. (Produced by solvent washing a clay filter which has been used in paraffine filtration to remove residual wax. An impure paraffinic material).

Clay wash wax

| | |
|---|---|
| Gravity degrees A. P. I. | 42.8 |
| Melting point (EMP) °F. | 129.5 |
| Tensile strength | 15 |
| Oil content per cent | 1.5 |

These two materials may be blended in the proportions of 35% wax and 65% asphalt to give a material having the following desirable properties.

Coating compound

| | |
|---|---|
| Melting point ring and ball °F. | 142 |
| Flash (C. O. C.) °F. | 415 |
| Ductility at 77° F. | 1 |
| Specific gravity 77° F. | 0.975 |
| Oliensis test | Passes |
| Needle penetration: | |
| @ 77° F. | 15 |
| @ 100° F. | 34 |
| @ 32° F. | 6 |

While I have above shown the use of the material known as "clay wash wax," I may use mixtures of unrefined paraffine waxes and microcrystalline waxes, and for compositions to meet rigorous conditions I find the use of microcrystalline waxes to be preferred.

With respect to the asphalt constituent, only an air blown asphalt produced from solvent tar appears to be suitable as being possessed of the proper physical properties. Attempts have been made to use air-blown asphalts of similar melting point not originating from solvent tar, and it has ben found that the products were not satisfactory. Not only were they deficient in desired physical properties, but also the combinations were possessed of a granular nature apparently due to some material present in the unsuitable asphalt which was not soluble in the final composition.

I claim:

1. A pipe coating protective composition consisting of a mixture of about equal proportions of an air blown asphalt derived from solvent tar, having a melting point of from about 175° F. to 240° F., and a petroleum wax having a melting point of from about 125° F. to 150° F., the mixture having a melting point (R & B) of from about 127° F. to about 150° F.

2. A pipe coating protective composition consisting of a mixture of from 50–65 percent of an air blown asphalt derived from solvent tar, and from 50–35 per cent of a petroleum wax, the asphalt having a melting point (R & B) of from about 175° F. to 240° F., the wax having a melting point of from about 125° F. to 150° F., the mixture having a melting point (R & B) of from about 127° F. to 150° F.

3. A pipe coating protective composition consisting of a mixture of from 35 to 50 percent of "clay wash wax" of about 130° F. melting point and 65 to 50 percent of an air blown asphalt derived from solvent tar, said asphalt having a melting point (R & B) of from about 175° F. to 240° F., said mixture having a melting point (R & B) of from about 127° F. to 150° F.

4. A pipe coating protective composition consisting of about 35 percent of "clay wash wax" of about 130° F. melting point and about 65 percent of an air blown asphalt of about 240° F. melting point (R & B) derived from blowing a solvent tar.

5. A pipe coating protective composition consisting of a mixture of from 50–65 percent of an air blown asphalt derived from solvent tar, and from 50–35 percent of a petroleum wax, the asphalt having a melting point (R & B) of from about 175° F. to 240° F., the wax having a melting point of from about 125° F. to 150° F. and consisting of a mixture of paraffine and microcrystalline wax, the mixture having a melting point (R & B) of from about 127° F. to 150° F.

6. A pipe coating protective composition consisting of a mixture of about equal proportions of an air blown asphalt derived from solvent tar, having a melting point of from about 175° F. to 240° F., and a microcrystalline wax having a melting point of from about 125° F. to 150° F., the mixture having a melting point (R & B) of from about 127° F. to about 150° F.

EDGAR A. KOENIG.